United States Patent [19]

Bourcier de Carbon de Previnquieres

[11] 3,865,168

[45] Feb. 11, 1975

[54] SNOW CHAINS AND APPARATUS FOR THEIR AUTOMATIC REMOTE FASTENING ON THE TIRE

[76] Inventor: Alain Bourcier de Carbon de Previnquieres, 6, Boulevard Victor Hugo 06, Nice, France

[22] Filed: May 21, 1973

[21] Appl. No.: 362,168

[30] Foreign Application Priority Data
May 23, 1972 France .............................. 72.19601
June 26, 1972 France .............................. 72.24178
Aug. 23, 1972 France .............................. 72.30708

[52] U.S. Cl. ............................... 152/213 A, 81/15.8
[51] Int. Cl. ............................................. B60c 27/06
[58] Field of Search ....... 152/213 R, 213 A; 81/15.8

[56] References Cited
UNITED STATES PATENTS

| | | | |
|---|---|---|---|
| 1,577,014 | 3/1926 | Gause | 152/213 A |
| 2,082,937 | 6/1937 | Bambenek | 152/213 A |
| 2,553,849 | 5/1951 | Dines | 152/213 R |
| 2,592,096 | 4/1952 | Young | 81/15.8 |
| 2,662,651 | 12/1952 | Gause | 152/213 R |

Primary Examiner—Drayton E. Hoffman

[57] ABSTRACT

Apparatus for automatically and remotely fastening the hook and link of the longitudinal internal chain of a snow-chain comprises a pliable or flexible strap terminated by a hook-fastening device, the thickness of the hook-fastening device being less than the width of the opening in the link, and a rigid rod terminated by a device for holding the link and keeping the link in a plane substantially perpendicular to the rod while leaving the opening in the link clear. The rigid rod and the pliable or flexible strap have no mechanical connection therebetween.

17 Claims, 17 Drawing Figures

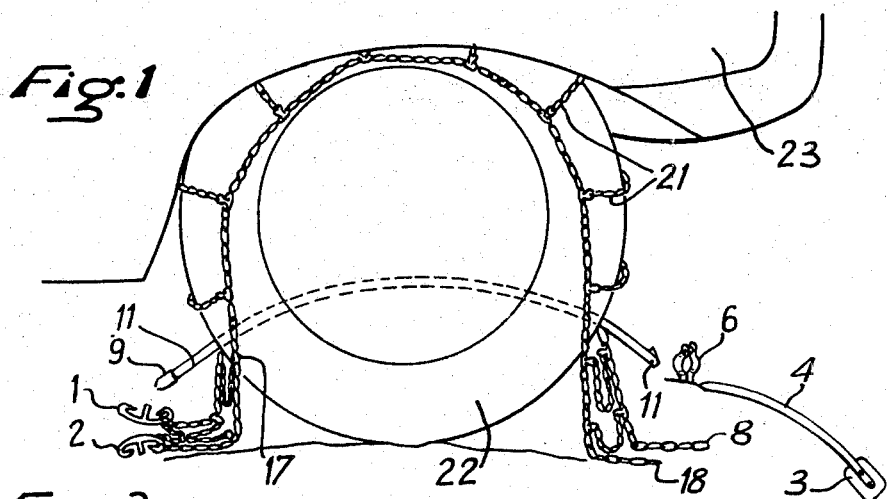
Fig.1
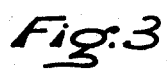
Fig.3
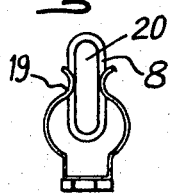
Fig.2
Fig.4
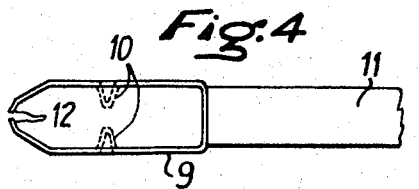
Fig.5
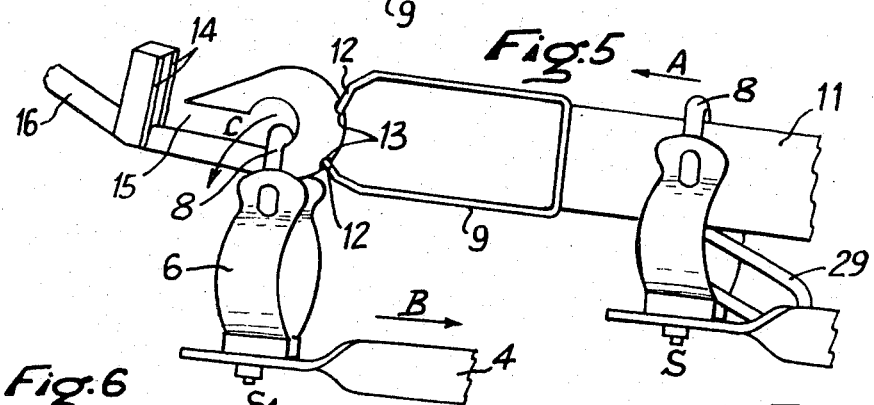
Fig.6
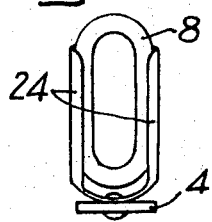
Fig.7
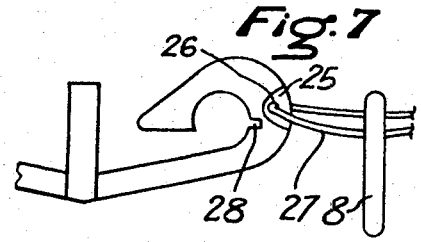

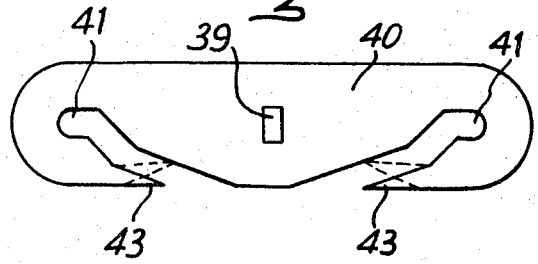
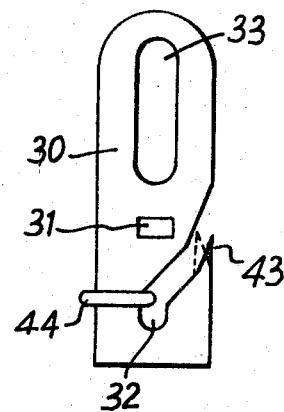
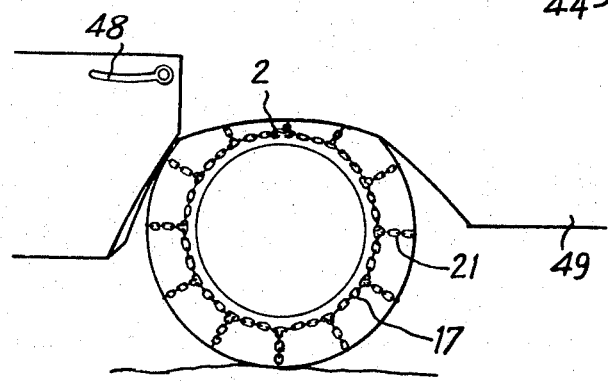
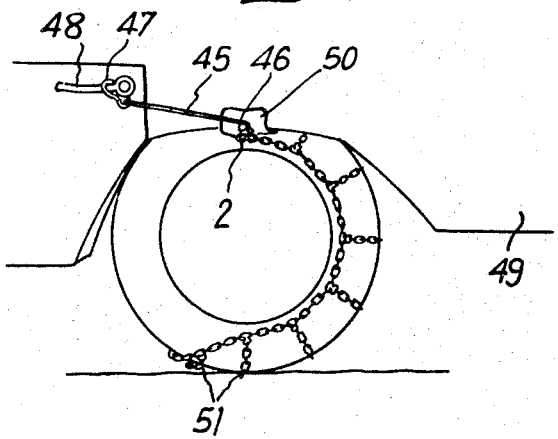
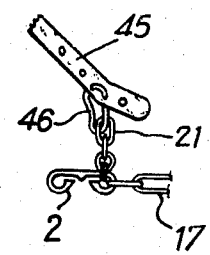

SNOW CHAINS AND APPARATUS FOR THEIR AUTOMATIC REMOTE FASTENING ON THE TIRE

The present invention relates to snow-chains and is intended to make them easier to position on the tire.

Ordinarily, snow-chains comprise two longitudinal chains interconnected by transversal chain sections or bars and each terminated, at one end, by a hook for co-operation with the link which terminates the other end.

Once the chain has been fastened on the tire, these hooks are in contact, one with the inner wall of the tire, under the chassis, and the other with the second, outer wall of the tire.

This outer wall alone is visible from the outside, and the same is true of the hook which is in contact with this wall and of the link for this hook. Both can be seen and gripped with the hands.

On the other hand, once the hook and link on the inner chain have been interengaged, they are both situated under the chassis, invisible from the outside, and cannot be reached, on mounting of the chain, without sliding under the chassis, for they are out of reach of the hand.

This real disadvantage is attenuated in forward drive vehicles. By turning each wheel to the right or the left, it is possible to see and grip the hook and link passed under the chassis at the moment of their fastening; however, this is not easy.

There are also mounting stirrups which, by winding the chain around the wheel, enable the said hook and link to be located at a point at which they are less awkward to grip. However, here again, it is frequently necessary to slide under the chassis to engage the link in its hook.

At present, no apparatus exists which enables the link and hook situated under the chassis to be fastened remotely in a really practical manner.

The apparatus in accordance with the invention enables one person, situated in front of the outer wall of a tire to effect automatic and remote fastening, although the operation is effected out of his sight, of the hook situated under the axle in its link, to fix the chain on the tire.

The apparatus which forms the object of the invention is characterised in that it consists, on the one hand, of a pliable or flexible strap terminated by a means for fastening the hook, the thickness of which fastening means is less than the width of the opening in the link, and, on the other hand, of a rigid rod, having no mechanical connection with the pliable or flexible strap and terminated by a link holding means keeping the link in a plane substantially perpendicular to the rod, while leaving the link opening free.

The invention also relates to other arrangements suitable for carrying out the aims of the invention, and in particular:

1. the pliable strap consists of a pliable or flexible strip having a width and thickness smaller than the length and the width respectively of the link opening, the said strap width being greater than the width of the link opening, 2. the flexible, pliable strip is terminated by a spring in the form of a double pin with bent ends for elastic insertion into two perforations formed in the hook and for removal from them by a sharp pull, 3. the holding means attached to the end of the rod is a spring in the form of a U-clip, the arms of which close together at their ends and are provided with ports of the same width as the diameter of the wire of the link, the said clip being attached to the end of the rod in such a position that the link, once it has been nipped between the arms of the clip and held by the slots above, occupies a position substantially perpendicular to the end of the rod, while its opening remains clear and a sharp pull enables the clip to be disengaged from the link, 4. the rod has at its end a fork enabling the rod to be used for pushing the chain onto the tire, 5. the holding means attached to the end of the rod is a spring in the form of a clip, the arms of which are provided with means for positioning the link, the said clip being attached to the end of the rod, in such a position that the link, once gripped between the arms of the clip, occupies a position substantially perpendicular to the end of the rod, 6. the holding means at the end of the rod is an elastic gripping means acting on a protruding portion of the link such as a lug, 7. the means for fastening the hook carried by the end of the pliable or flexible strap is a strap which is threaded into a perforation provided at the end of the hook, 8. the hook fastening means is an apparatus operating by gripping the sides of the hook, which may be provided with scores, lugs or reliefs to improve the adherence of this gripping, 9. the hook is provided with a stop means limiting the advance of the link on the said hook, 10. the terminal hook of at least one of the two longitudinal chains is replaced by a plate having an elongate opening at one end allowing introduction of the hook and a circular opening at the other end into which the next link in the chain passes, a third opening of non-circular and preferably rectangular shape being provided between the two first openings, and the end of the rigid extension-piece carries a means for holding the link consisting of a lug having a section corresponding to the third opening of the link so that it can be inserted into the latter without being able to pivot, the said lug being terminated by a back stop limiting the extent of its insertion into the said opening, 11. the chain has, approximately in its middle, a median plate replacing three links and having the length of three joined links, terminated by two orifices, situated at each of its ends respectively, and co-operating with the adjacent links, and having a central orifice of suitable shapes and dimensions for co-operation with the terminal portion of the rigid rod, 12. the central orifice of the median plate has a rectangular section corresponding to that of the lug terminating the rigid rod, 13. the central, rectangular orifice of the median plate is arranged transversely of the tongue, 14. an elastic element terminated by two hooks is provided to effect the chain unfastening operation.

These two hooks are unequal, one having a size comparable to that of a link of the chain, while the other is curved with a radius several times greater than the latter.

15. The elastic element is connected to at least one of the hooks by at least one extension of adjustable length such as a perforated strip.

These arrangements and certain others are illustrated in the attached drawings in which:

3

FIG. 1 is a diagrammatic sketch showing a snow-chain in the course of being mounted on a tire, with the arrangements of the invention;

FIG. 2 shows the rigid rod and its link holding means;

FIG. 3 is an end-view of this holding means;

FIG. 4 shows the end of the pliable strap with its holding means;

Figure 8:
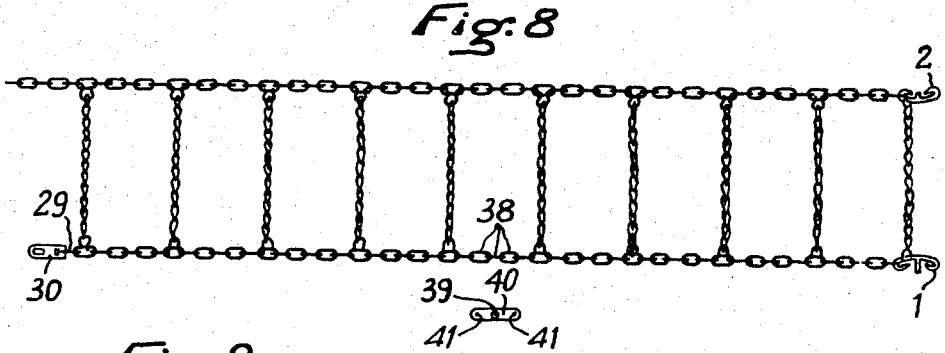
Figure 9:
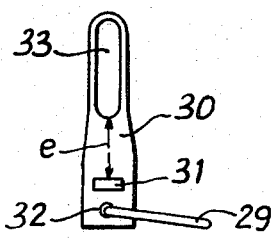
Figure 10:
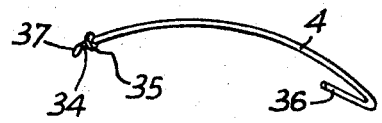
Figure 11:
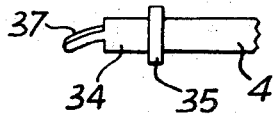
Figure 12:
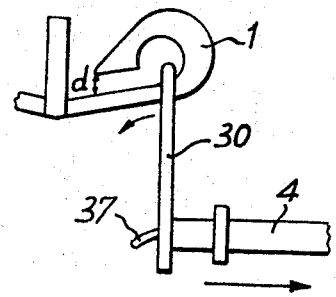

FIG. 5, showing the fastening operation, is a detailed sketch;

FIG. 6 shows a modification of the link holding clip;

FIG. 7 shows a modification of the hook;

FIG. 8 shows a ladder-chain provided with apparatus in accordance with the invention;

FIG. 9 is a detailed view of the special link;

FIG. 10 shows a modification of rod 4 corresponding to the link of FIG. 9;

FIG. 11 is a detailed view of the end of the rod of FIG. 10;

FIG. 12 shows the use of the link and rod of FIGS. 9 and 10, in profile;

FIGS. 13 and 14 show modifications on the snap-hook and plate of FIGS. 8 to 12;

FIGS. 15, 16 and 17 show the unfastening apparatus of the invention, diagrammatically.

FIGS. 1 to 5 show a snow-chain of the type known as a "ladder-chain," consisting of two longitudinal, inner and outer chains 8 and 18, interconnected by bars 21 made of chain sections (or consisting of rigid rings), each chain being terminated at one end by a hook 1, 2, for co-operation with the terminal link 8, 18 of the same chain.

In FIG. 1, the chain is placed on the tyre 22 and the outline of the bodywork of the car shown at 23.

The apparatus in accordance with the invention consists: on the one hand of an extension-piece 11 formed of a pliable or flexible strap, terminated by a means 9 for fastening the hook, the thickness of which is less than the width of the opening of a terminal link of longitudinal chain 8 (or 18);

on the other hand, of an extension-piece 4 consisting of a rigid rod, having no mechanical connection with strap 11 and independent of the latter, the said rod 4 having a handle 3 at one end and a means 6 for holding the link at the other, suitable for holding the link in a plane substantially perpendicular to the end of the rod.

This means is shown in more detail in FIGS. 2, 3 and 5. It has the form of a generally U-shaped spring 6, the ends of which come together towards their ends 19 and have symmetrical openings 7 of elongate shape, so formed that link 8 can be held rigidly in a vertical position during the operation, without its orifice 20 being obstructed by the sides 19 of the clip.

At the end of this extension is advantageously provided a fork 5, which will possibly be used to push the chain more easily, when it is placed on top of the tire and mainly when the wings of the vehicle envelope the tire to a particularly high degree.

Extension 11 for the hook is preferably a flexible, metal strip, which is sufficiently long to protrude beyond the tire on either side and of a width enabling it to be threaded into link 8 without being able to turn.

At its end is the holding means 9 for hook 1, which holding means is here a spring, comparable to a double pin with the ends 12 divided, bent and brought adjacent to each other. To increase the efficiency of this spring, it is possible to attach a rubber to it, which will be inserted in two bends 10 formed for this purpose in spring 9 and shown in broken lines in FIG. 4.

Strip 11 and spring 9 are attached to each other by any fastening means which does not obstruct the passage of strip 11, or that of spring 9 in orifice 20 of the link, or the sliding of the link as it passes from strip 11 onto spring 9 (FIG. 5).

To grip hook 1 by means of spring 9, two cavities 13 (FIG. 5) are provided in the hook for this purpose, for reception of the ends 12 of the spring.

Moreover, the loop of the hook must be of a shape and size to enable it to enter easily into link 8. In short, the hook must be able to penetrate the link with the whole of its loop.

Finally, the hook will advantageously have a stop 14 (FIG. 5) against which the link will impinge.

The operation of the apparatus is as follows.

When the chain has been arranged on the tire as shown in FIG. 1, strip 11 is slipped behind the wheel so that its ends protrude to the right and left of tire 22; the ends 12 of spring 9 are introduced into perforations 13 in hook 1; link 8 is introduced into clip 6 and strip 11 is introduced into link 8.

By pulling on strip 11 on the one hand and pushing on rod 4 on the other, sliding is then caused of link 8 on strip 11. The fact that link 8 is held perpendicularly to the end of rod 4 avoids any jamming of the link on strip 11, and there is no other possibility of jamming because of the absence of mechanical connection between strip 11 and rigid rod 4.

As shown in FIG. 5, link 8, passing through position S, moves in the direction of arrow A and impinges against stop 14 of hook 1, its weight then causing it to fall into the mouth 15 of the hook.

All that is then necessary to release extension 4 is to pull it in the direction of arrow B.

In fact, link 8 has passed into position S1 and, by pulling on extension 4, it swivels in the direction of arrow C and extension 4 is detached by separation of the arms of clip 6.

As regards the strip, if it is pulled sufficiently hard in the direction of arrow B, the two jaws 12 separate and spring 9 is detached, releasing its strip 11.

The whole of this operation is extremely simple; the apparatus of the invention consists of two elements which are easy to manipulate and inexpensive, and they are so conceived that their operation is efficient and reliable. It is, in fact, an apparatus which is rarely used and generally left for long periods, without any attention, in the bottom of the car trunk or in a corner of the garage. On the other hand, its use requires it to be placed in contact with the ground. For this reason the majority of apparatus of this type only work when new and are subject to jamming and unserviceable after use.

The apparatus of the invention is free of these disadvantages because of the absence of mechanical connection between its different parts and because link 8 is simply held in the correct position by clip 6.

Different modifications can be adopted for the practical construction of the apparatus.

Thus FIG. 6 shows a modification of the means 6 for holding the link, in which arms 24 of the spring in the form of a clip have the shape of troughs for holding link 8.

Similarly, a metal strip has been specified to direct link 8 towards hook 1. However, a simple strap such as a string would be suitable, the rear end of means 9 terminating in a point for the righting of the hook and its guiding to be carried out automatically.

The means for holding the hook can be a flat clip acting on the sides of the possibly grooved hook, or by passage of a strap 27 into a groove 28 or into a hole 26, it being possible to reduce the thickness of the hook in a zone 25 (FIG. 7).

The apparatus described in FIGS. 1 to 7 can be adapted to commercial chains without substantial modification; all that is necessary is to form two bores 13 in the end of hook 1, or to use a means 9 of the flat clip type, requiring no modification of the hook.

However, the apparatus can be made still easier to manage on the condition of certain modifications to the snow-chain.

In fact, FIG. 1 shows a ladder-chain positioned on the tire, the hook for attachment under the chassis being on the ground in the position which it must then normally occupy. However, this supposes that the chain has been previously spread on the ground to locate: its center, the special hook to be fastened (perforation 13) and, subsequently, the side of the chain which must be placed on the outside. This is a time-taking procedure.

On the other hand the use of clip 9 includes the possibility of error. For example, link 29 (FIG. 5) must be at the bottom of link 8 (the latter being offered vertically), in order not to impede the entry of the hook into the area 20 of this link 8; now it has been found in practise that certain people introduce link 8 into clip 6, with link 29 still above link 8, in the portion which does not enter clip 6. As a result, the hook can no longer enter the area 20 reserved for it.

The arrangements of FIGS. 8 to 12 tend to overcome these disadvantages.

In accordance with the figures, the chain is provided with a special link 30, to which corresponds a special holding means 37 at the end of rod 4.

FIG. 8 shows a ladder-chain spread out on the ground. One of the uprights extends from 1 to 30. It is for contact with the inside wall of the tyre, under the chassis.

This upright has:

at 1, the hook provided with a stop 14 described in FIGS. 1 and 5, at 30 the special link connected to the preceding link 29, and at 38 three central links which are advantageously replaced by plate 40.

Link 30 is shown in detail in FIG. 9. It is in the form of a plate with rounded edges bearing an elongate opening 33 at one end, allowing introduction of hook 1, and a hole 32 at the other end for passage of the following link 29.

Thus link 29 can never impede the passage of pliable or flexible strap 11, even if link 30 is mounted in reverse, as link 29 does not pass into eye 33.

On the other hand, link 30 has a non-circular, central orifice 31, which is preferably rectangular, into which end 37 of rigid rod 4 will be introduced.

Provided that plate 30 is of sufficient thickness (comparable to that of an ordinary link and not less than 3 mm), the simple insertion of end 37 into orifice 31 is sufficient to maintain this link in a position (approximately) perpendicular to rod 4, without link 30 being able to turn, because of the shape of orifice 31.

To allow easy disengagement of end 37 from orifice 31, this end is curved, as shown in FIGS. 11 and 12; the pull which is applied to rod 4 tends to swivel link 30 in the direction of the arrow and disengagement is therefore facilitated.

The distance (FIG. 9) separating the two orifices 33 and 31, for the hook and the extension respectively, must be greater than the distance $d$ (FIG. 12) separating the point of the hook from its shank, so that when an incorrect maneuver takes place which would result in the hook being threaded point downwards (facing the ground) in the link, the point of the hook cannot be inserted into orifice 31 and give the illusion that the chain is properly fastened.

Portion 37 of extension 4 (FIGS. 10 and 11), which must match the shape of orifice 31 will, therefore, here be of rectangular section.

Plate 40, FIG. 8, is substantially of the same thickness and the same width as links 38 which it replaces, and is of the same length as the three of them connected. It has two orifices 41, which enable the adjacent links to be inserted in it perpendicularly to the wall of the tyre, the plate remaining in a plane parallel to the one containing the wall of the tyre.

At the centre of this plate is a circular opening 39, which passes through it from one side to the other, by which it will be possible to grasp the chain and slide it between the tire and the wing of the chassis, by means of the circular portion 34 (FIG. 11) of extension 4. Portions 37 and 34 will enter successively into orifice 39 up to collar 35 which serves as a stop.

In FIG. 8, this plate 40 has not been incorporated into the chain, but placed immediately below, both to show which links it optionally replaces and because it is not indespensible. It is, however, very useful.

Firstly, it enables the ladder chain to be gripped easily. When held by this plate, the chain can be entirely unravelled at the shortest distance from the ground (since it is then divided into two equal portions), while it remains in equilibrium, a little like a steelyard. Because of this, its centre and ends are found at once, avoiding useless operations which would lead not only to wasted time, but also, very often, to tangling of the chain, particularly to twisting the uprights together. Now this chain must be placed on the top of the tire, the middles of its two uprights coinciding as exactly as possible with the top of the tire.

In addition to the middle of the chain, this plate indicates those of the two longitudinal chains which must be slipped between the wing and the tire. It is this chain which must have the special link 30 at one end and hook 1 (different from hook 2) at the other.

Moreover, if the trouble is taken to mark the correct side of this plate with a distinctive inscription, indicating that this inscription must be upright and the hooks on the left when portion 34 of extension 4 is inserted in orifice 39, in addition the chain will always be positioned on the correct tread side, by these means.

Alternatively, as shown in FIGS. 13 and 14, holes 41 in plate 40 and hole 32 in link 30 can be made in the form of slots at an acute angle, bevelled from the central zone of the said plate or the said link.

This arrangement permits immediate mounting of link 30 or plate 40 on a commercial chain. By removing the terminal link and inserting link 29 as far as 32, all that is necessary is to hammer down point 43 to mount the special link.

The operation for the plate is the same. During fitting of the chain, before turning down point 43, if it is required to prevent link 29 from rising in the groove to end 43, a rubber ring 44 is located before turning down point 43.

An equivalent modification consists of making openings 32 and 41 in the form of snap-hook openings, or in the form of slots having retaining means.

In the modification of FIGS. 13 and 14, central hole 39 of plate 40 has the same shape as hole 31 of link 30, which enables plate 40 to be caught with end 37 of rod 4 (FIG. 10). Collar 35 can thus be removed.

Removal of snow-chains is a problem as awkward as that of mounting them.

The apparatus shown in FIGS. 15, 16 and 17 enables this unfastening to be carried out easily.

This apparatus consists of an elastic strap 45 terminated by two hooks, one 46 of which is narrow and able to be inserted in a link of a transversal bar 21 of chain 17, and the other 47 of which is fairly large, so that it can be secured to the various elements of an ordinary car: door-handle 48, trunk hinge, edge of the opposite wing, etc.

The length of strap 45 when relaxed is preferably adjustable, and it is preferably provided along a portion of its length with holes permitting the insertion of hooks 46 and 47 in different positions. For example, it will be an intermittently perforated rubber belt.

The invention relates to the method for unfastening the snow-chains, consisting of the following operations:

The user stops his car 49 so that hook 2 is at the top portion of the tire. He removes the tensioners (rubber or springs) which he may have used.

He places hook 46 in a link of bar 21 which connects hook 2 to hook 1 (not shown in the figure) and he fastens hook 47 at a suitable point on the car, e.g., handle 48, so that strap 45 is tensioned.

To prevent any scratching, a wad 50, rag, foam cushion, or the like, can be inserted between strap 45 and the bodywork.

When hook 2 has been withdrawn from its link, the chain adopts the position of FIG. 16, with a portion 51 fallen to the ground.

The user then moves the car a few dozen centimetres until portion 51, gripped between the tyre and the ground, is released. At this moment, elastic strap 45 causes the chain to slide on the tyre and draws hook 1 outwards, where it can be reached with the hand and unfastened.

Rubber 45 has thus fulfilled a quadruple role:

1. During the movement of the car, it prevents the partially unfastened chain from falling onto the axle, while keeping it spread on top of the tire;

2. after this operation, it has caused upward sliding of the chain, which has resulted in causing, by contact of the chain with the brake-drum, the noise which warns the driver that the operation has been effected and that he must stop;

3. by causing this upward sliding of the chain, without effort or work on the part of the user, it has directed the hook to be grasped, formerly situated on the inner wall of the tire, towards the outer wall of the tire;

4. the necessity of advancing the left wheels and reversing the right wheels, to release the bars gripped against the ground, makes only rubber suitable for this operation because of its extensibility. In fact, it happens that certain people make a mistake and reverse instead of advancing and vice versa. The extensibility of the rubber allows this error to be neutralised without damage and without sliding of the chain on the axle.

I claim:

1. Apparatus for automatic remote fastening of the hook and link of the longitudinal internal chain of a snow-chain, which comprises a pliable or flexible strap terminated by a hook fastening means, the thickness of which fastening means is less than the width of the opening in the link, and a rigid rod having no mechanical connection with the pliable or flexible strap and terminated by a means for holding the link, keeping the latter in a plane substantially perpendicular to the rod while leaving the opening in the link clear.

2. Apparatus in accordance with claim 1, characterised in that the pliable strap consists of a pliable or flexible strip of width and thickness less than the length and width respectively of the opening in the link, the said width of the strap being greater than the width of the opening of the link.

3. Apparatus in accordance with claim 2, characterised in that the flexible/pliable strip is terminated by a spring in the form of a double pin with bent ends for elastic insertion into two perforations formed in the hook and for extraction from them by a sharp pull.

4. Apparatus in accordance with claim 1 characterised in that the holding means attached to the end of the rod is a spring in the form of a U-shaped clip, the arms of which come together at their ends and are provided with grooves of the same width as the diameter of the wire of the link, the said clip being attached to the end of the rod in such a position that, once the link has been gripped between the arms of the clip and held by the above slots, it occupies a position substantially perpendicular to the end of the rod while its opening remains clear and that a sharp pull enables the clip to be disengaged from the link.

5. Apparatus in accordance with claim 1, characterised in that the rod has a fork at its end to allow the rod to be used to push the chain onto the tire.

6. Apparatus in accordance with claim 1, characterised in that the holding means attached to the end of the rod is a spring in the form of a clip, the arms of which are provided with link positioning means, the said clip being attached to the end of the rod in such a position that, once the link has been gripped between the arms of the clip, it occupies a position substantially perpendicular to the end of the rod.

7. Apparatus in accordance with claim 1 in which the holding means at the end of the rod is an elastic gripping means acting on a protruding portion of the link such as a lug.

8. Apparatus in accordance with claim 1, characterised in that the hook fastening means carried at the end of the pliable or flexible strap is a strap which is threaded into a perforation provided at the end of the hook.

9. Apparatus in accordance with claim 1 characterised in that the hook fastening means is an apparatus operating by gripping the sides of the hook which may be provided with scoring, lugs or reliefs improving the adherence of this grip.

10. Apparatus in accordance with claim 1, characterised in that the hook is provided with a stop means limiting the advance of the link on the said hook.

11. Apparatus in accordance with claim 1, characterised in that it comprises a special terminal link for at least one of the two longitudinal chains, this link consisting of a plate, having an elongate opening at one end permitting introduction of the hook and a circular opening at the other end into which the following link in the chain passes, a third opening of non-circular shape being provided between the two first openings, and the end of the rigid extension carries a link holding means consisting of a lug having a section corresponding to the third opening of the link so as to be able to be inserted into the latter without being able to pivot, the said lug being terminated by a rear stop limiting the extent of its insertion into the said opening.

12. Apparatus in accordance with claim 11 in which the special link has a thickness comparable to that of a chain link and equal to at least 3 mm.

13. Apparatus in accordance with claim 11, in which the distance between the elongate opening and the central opening of the link is greater than the opening of the hook of the chain.

14. Apparatus in accordance with claim 11, in which the terminal lug of the rod is curved.

15. Apparatus in accordance with claim 11, comprising a plate having the length of three connected links and designed to replace three central links of the inner longitudinal chain; this plate having at its ends two orifices co-operating with the adjacent links and a central orifice of suitable shapes and dimensions to co-operate with the terminal portion of the rigid rod.

16. Apparatus in accordance with claim 11, in which the openings in the special link for reception of the adjacent links of the chain are made in the form of slots which are open on a lateral portion of the said links, retaining means being provided for locking the adjacent links in place.

17. Apparatus in accordance with claim 16 in which the slots are cut on a bevel from the central zone of the said links or plate, the pointed edges of the said slots being turned down after insertion of the links.

* * * * *